Aug. 2, 1960 A. KAROLUS 2,947,809
MAGNETIC PICTURE RECORDING
Filed Feb. 24, 1953 2 Sheets-Sheet 1

INVENTOR.
AUGUST KAROLUS
BY Theodor Haefe
ATTORNEY

Aug. 2, 1960 A. KAROLUS 2,947,809
MAGNETIC PICTURE RECORDING
Filed Feb. 24, 1953 2 Sheets-Sheet 2

INVENTOR.
AUGUST KAROLUS
BY Theodore Haynes
ATTORNEY 2,947,809

MAGNETIC PICTURE RECORDING

August Karolus, Hohenstrasse 52, Zollikon-Zurich, Switzerland

Filed Feb. 24, 1953, Ser. No. 338,544
Claims priority, application Germany Feb. 29, 1952
6 Claims. (Cl. 178—6.6)

Since the start of television development, proposals have been discussed to register the image signals mechanically or magnetically, so as to retain the image. The advantages of such registration as compared with optical or photographic processing are obvious. A magnetic registration of a television picture could be reproduced without any loss in time. The shooting of the picture could be repeated if necessary immediately.

A television picture at today's European standards contains about 625 lines with about 400,000 image elements. Since these elements must be transmited 25 times per second, the number of image elements per second amounts to $25 \times 4 \times 10^5 = 10^7$. It is difficult if not impossible to record these $10^7$ image elements with one recording head in the manner customary today in magnetic sound recording, irrespective of whether the record band or the recording head is moved. The upper frequency limit in today's sound recording is 15 to 20 kc., at a band speed of 30 inches per second. The recording of $10^7$ image elements per second would require enlargement of the band speed by about two orders of magnitude, i.e. a speed of more than 330 feet per second (at a wave length of magnetic recording of 50$\mu$, the speed would be =1650 foot per second).

One of the objects of this invention is to record a television picture magnetically through a system of $n$ recording devices or magnetic heads; $n$ corresponds to the resolution of an image line and all $n$ heads of a line are arranged next to each other or in juxtaposition. The intensity distribution along a line of a television picture is transmitted to the $n$ heads by means of a cathode ray switch or an equivalent optical distributor so that the current values of the individual heads correspond at each moment to the intensity values of the correlated picture elements.

Another object of the invention is to provide a recording band of about 12 inches width consisting of non-magnetic substances. The band is arranged to move past about 600 recording heads, in case the horizontal image line is to be resolved in 600 units or image elements.

The slit width of a magnetic recorder or ring head amounts as usual to 20 to 30 $\mu$; the length of a head to about .5 mm. ($600 \times .5 = 300$ mm.).

These and other objects of the invention will be more fully apparent from the drawings annexed herewith in which Figs. 1, *a*, *b* and *c* show diagrammatically an arrangement of the recording heads embodying certain features of the invention.

In Fig. 1*a* the heads $n$ are shown to be arranged in juxtaposition.

In view of the space requirements of the magnetizing coils the 600 heads are arranged in three to four rows as apparent from Fig. 1*b*.

The arrangement of the heads must be the same for production and reproduction. The record band is preferably perforated and transported with constant speed at about 30 inches per second. Since each head will only record the image elements arranged one upon the other in a vertical row, the number of image elements per second and per head will be 15,000. Consequently the maximum frequency per head amounts only to 7,500 cycles in accordance with the definitions established in television technique. A frequency of 7.5 kc. can be easily registered at the above mentioned speed.

The band for magnetic picture recording can be constructed in the same manner as is usual today for magnetic sound recording. In order to insure invariability of dimensions, however, for picture recording, thin bands of non-magnetic metal are preferred. These bands are covered with a nickel-cobalt or nickel-iron alloy. A metal band can be coated for the present purpose on one or both sides with a ferro-magnetic layer of great remanency and coercive force. The coating however can also be subdivided in $n$ strips, each having the width of a magnetic sound track, all this without exceeding the scope of the invention.

Figure 2:
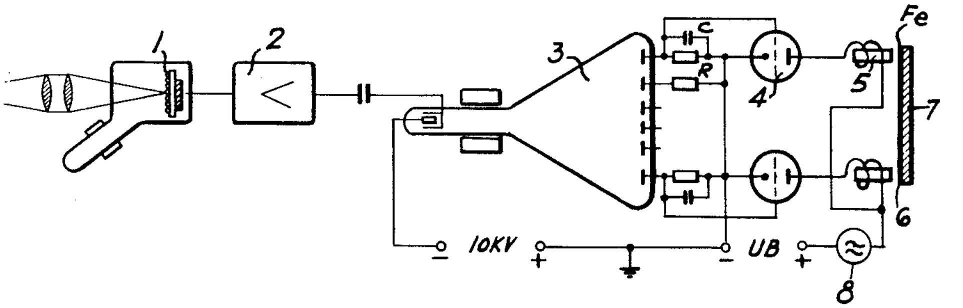
Fig. 2 shows a diagrammatic realization of a recording apparatus.

During production or picture taking, the following procedure is observed:

At the out-set the interlaced scanning will be disregarded and it will be assumed that 25 images each having 600 lines are to be recorded per second. The generation of a video signal is delivered in the usual form through a super-iconoscope, a Vidicon or an Image Orthocon as shown in Fig. 2. Following picture taking through one of the above mentioned television cameras and amplification of the television signals through amplifier 2, a cathode ray switch 3 is provided which distributes the image signals of a line upon $n$ contacts connected to RC storage members or networks.

Such a cathode ray switch is well known in the art.

The contacts of the cathode switch can be arranged along a circular path or along a straight line. Accordingly the electron ray will be deflected circularly through a rotary field or linearly through a sawtooth current. The cathode ray passes over all $n$ contacts within the duration of a line. The image signal supplied from the television camera is applied to modulate on the Wehnelt cylinder of cathode ray switch 3 the intensity of the beam current. In this manner the charge supplied to each contact and each storage member, will be determined. The intensity values of all $n$ image elements arranged in the direction of a line are distributed over the $n$ RC members at the end of a switch movement. The voltage of the storage elements, at positive modulation for white picture elements, amounts to a few volts for a beam current of 1 ma. and storage capacities of 50 pf. The time constant of the RC members is $1.10^{-4}$ second.

Figure 3:
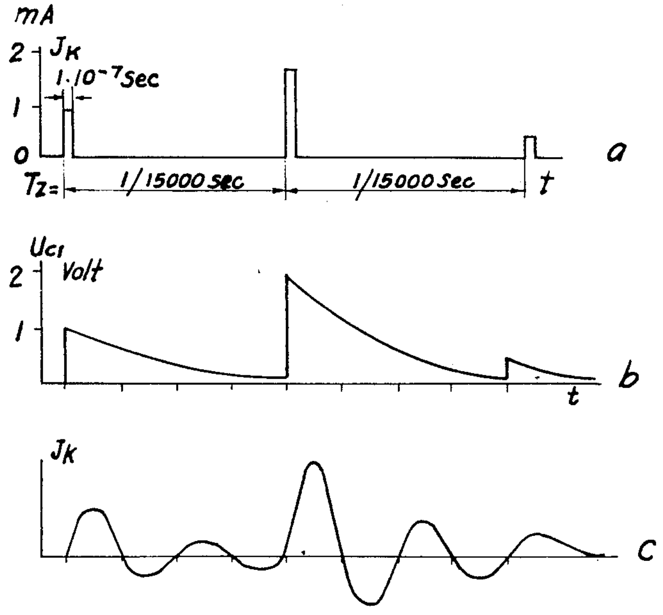
Fig. 3 shows certain preferred wave forms.

Fig. 3–*a* shows the characteristic of the electron current of any storage member; the duration of the current supply and thus the duration or decay time of a charge amounts to $10^{-7}$ second (duration of one image element).

Fig. 3–*b* shows the exponential discharge of a storage condenser C over an ohmic resistance R whereby $RC = 1/15{,}000$ second (line duration).

In Fig. 3 it is assumed that the intensity of an image element is changed at three consecutive charges. The low frequency current shock corresponding to the discharge of the storage member is now able to control the current of a corresponding recording head in the same time sequence. Between each RC member and the corresponding recording head (5 in Fig. 2) therefore there must be inserted an amplifier tube as shown in Fig. 2 at 4. This amplifier tube serves to supply a carrier vibration of about 1 to 2 periods per line duration, i.e. of frequency of 15–30 kc. as apparent from Fig. 3-*c*. The carrier vibration derived at 8 and superimposed upon D.C. anode voltage $U_B$ is amplitude modulated by the voltage wave along the RC member. The introduction of such a carrier vibration permits, even with inductive reproduction of the record, properly to reproduce the average intensity of all image elements (D.C. component), and recorded on magnetic layer 6 of record band 7.

At the recording head an auxiliary vibration of 100 to 200 kc. can be superimposed upon the picture signal (carrier frequency of 20 kc. and its side bands), as is usual in magnetic sound recording but not shown in Fig. 2.

Through the displacement of the magnetic band in longitudinal direction, the magnetic recordings of all *n* heads are displaced within the duration of one line by a few slit widths. In this way the individual lines will be registered one beneath the other.

Figure 1:
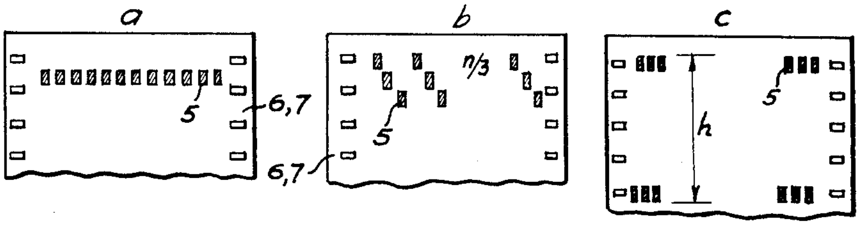

In case a magnetic picture is to be registered in a method involving line jumping in accordance with the today's television standards, the *n* recording heads must be arranged twice at a distance of one image height. A corresponding arrangement is shown in Fig. 1-*c*.

When the magnetic film is moved over the upper row of the heads, there are recorded at first the odd lines within $\frac{1}{50}$ second. At the end of $\frac{1}{50}$ second (of a raster) the film is displaced by the height *h* and the position of the second row of heads is reached. In the next $\frac{1}{50}$ second the second row of heads will record the even image lines in the holes left during the first recording. In this case the holes are caused by the fact that the film during the duration of a line is displaced by the transport mechanism by the height of two lines. It is therefore necessary by means of an electric switchover to connect alternatingly the two rows of recording members to the amplifier output.

Reproduction occurs in the following manner:

The reproduction of a magetic picture would be particularly simple if it were possible to make directly visible the distribution of the magnetic field, for example by finely distributed iron powder. The magnetic records thus retranslated into a visible picture would thereafter be scanned and reproduced with an usual television recording camera. It has however not yet been fully established whether or not such or a similar process would result in an image of sufficient contrast.

In accordance with the invention the reproduction of a magnetic picture record is achieved by scanning the record through a system of *n* heads as has been described for the production side. This system of *n* heads has the same geometrical arrangement for both producing and reproducing. The band is transported in both cases with the same speed. The potentials induced in each ring head through the flux changes, are amplified in one or two amplifier stages and then fed into a device which realizes the transition from the *n* channels to a single channel.

Such an arrangement based on a multitude of *n* control grids can principally be so constructed as described in German patent specification 664,083.

The manufacture of such a switch, having a control grid in front of each contact, however, is substantially more difficult as shown by experience than that of a switch causing the transition from one to *n* channels. It is therefore preferred to replace such a switch with a normal television camera tube.

Figure 4:
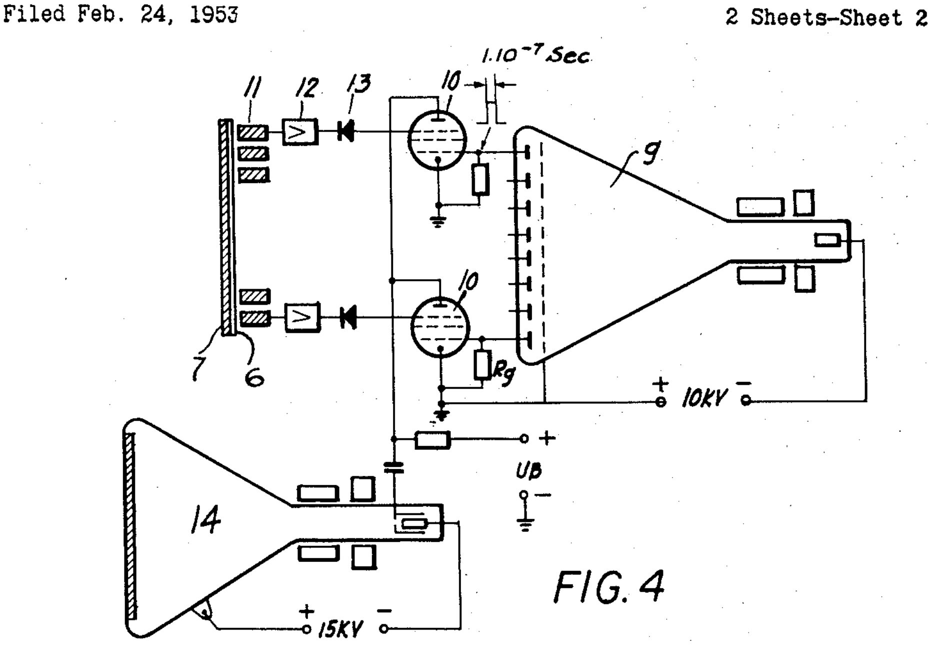
Fig. 4 shows a modified reproducing apparatus.

The reproduction of a magnetic picture record and retranslation of the magnetic fields disposed along the line, into a sequence of electric signals, can be achieved with the use of a cathode ray switch 9 in a manner such as shown in Fig. 4.

In Fig. 4 the cathode ray passes in the same manner as during the recording of the magnetic picture over *n* contacts within the duration of a line ($\frac{1}{15{,}000}$ second). In contrast, however, to recording the beam current intensity remains constant. The voltage impulses produced on each contact are all of equal height. They are displaced in time from contact to contact by $1.10^{-7}$ second. The grid resistance must be so dimensioned that the time constant of the grid circuit is less than $1.10^{-7}$ second. In this case the amplifier stage 9, 10 connected to the contact is at each moment scanned on their grids or tested as to their output power only for such a short time as the cathode ray rests upon the contact element concerned. As in the case of usual mixer tube hexodes, the tube H contains a second control grid the voltage of which is derived from the signal of the magnetic head 11 associated therewith, and amplified and rectified at 12 and 13 respectively.

The current intensity flowing the mixer hexode is determined by the magnetic signal. The evaluation of all the voltages simultaneously produced by the heads is achieved by the successive scanning of the mixer tubes by means of cathode ray switch 9. All *n* mixer tubes possess a common anode resistance. The signal produced at this resistance is applied on the control cylinder (Wehnelt) of a normal television receiver tube 14.

In the description of the recording method, a cathode ray switch is used having 500 to 600 contacts. Although such a switch is feasible, it is recommended in certain cases to subdivide the contacts into several individual switches.

For example, an electron beam switch can be provided with only about 150 contacts arranged in a circular path. Four switches of the same construction are put into operation one after the other by means of impulses. The frequency of the rotary field in this case is four times the line frequency. The switching impulses are derived from the line frequency by means of frequency duplication. The rotary fields of the four switches are identical.

It will not be necessary to cause switchover by means of impulses if the contacts of each switch are arranged in a linear array. The deflection frequency of the sawtooth wave equals the line frequency. The deflection amplitudes are four times as large as necessary for passing over the contact row. The rest positions of the individual switches are so displaced that the switches start to function one after another.

Figure 5:
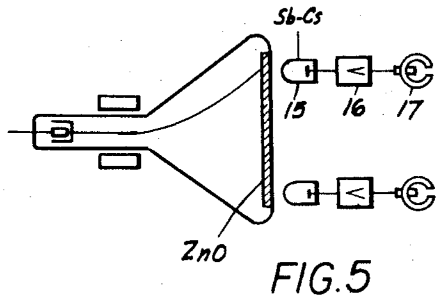
Figs. 5 and 6 represent a modified channel distributor, inside and front views respectively.

A particularly simple technical solution for the transition from one channel to *n* channels is represented in a distributor as shown in Fig. 5.

In Fig. 5 a normal television receiver tube having a diameter of 12 to 16 inches, registers the intensity distribution of a line on a circular path. The outer wall of the tube has arranged thereon the light sensitive layers of a number of photoelectric cells. The phosphor of the tube in this case is extinguished within the duration of one line. The modulation of this switch is caused on the Wehnelt cylinder.

After a one-time circulation of the electron beam the intensity distribution of one line is recorded along the path. In the *n* photo-electric cells 15, there are excited currents corresponding to the intensity of the correlated image elements.

In case *Sb*—*Cs* cells are used, an amplifier stage 16 is inserted, between each photo-electric cell 15 and its magnetic recording head 17. The amplification requirements therefore are the same as with the use of a cathode ray switch.

Figure 6:
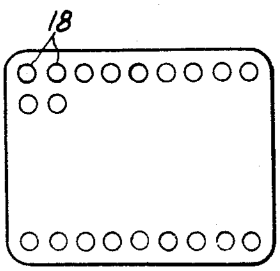

Fig. 6 shows an arrangement of *n* photo-electric cells 18 distributed over the entire surface of a picture tube, for example 20 rows of 30 cells each. With this arrangement the size of a switch contact is about 1 sq. cm. In this case the horizontal deflection of the electron ray is caused at 20 times the line frequency.

The same electro-optic arrangement can also be used for the reproduction of a magnetic sound record as well as for the transition of one channel to *n* channels. In this case however the phosphor of the distributor tube produces switching impulses of the duration of one image element, i.e. $10^{-7}$ second. It is known that ZnO phosphors are extinguished within such a time if in accordance with this invention their emission in the ultra-violet range is utilized.

I claim:

1. In an apparatus for the magnetic recording and reproduction of pictures, television camera means of predetermined line scanning frequency for translating each line of the picture into a number of electric signals representing the intensities of a number of line elements, each element forming a fraction of a line and occupying a corresponding fraction of the frequency range of a line; a number of separate means including a source of carrier wave for separately modulating at least some of said line signals upon said carrier wave, said carrier wave having a frequency of an integral multiple of the line frequency, and said integral multiple including the line frequency itself; an electronic switch including an input coupled to said television camera means and a number of outputs coupled to said modulating means, means for producing a cathode ray, and means including means for deflecting said cathode ray at said predetermined line scanning frequency, for distributing the intensity representing signals of said line elements to said modulating means on a time sharing basis; a number of separate magnetic recording means and means for applying the modulated carrier waves to said recording means.

2. Apparatus according to claim 1 comprising means including a capacity shunted resistance connected with each of said outputs for storing at least part of the charge applied thereon for line duration.

3. Apparatus according to claim 1 wherein said electronic switch includes a television receiver tube and means including a number of photoelectric cells arranged on the outer wall of said receiving tube for transmitting the intensity representative signals of the elements of one picture line to said modulating means.

4. Apparatus according to claim 3 wherein said television receiver tube has a fluorescent screen having an extinction time of line duration at said predetermined frequency.

5. Apparatus according to claim 1, comprising reproducing means including a number of reproducing heads, a television receiver tube, and another electronic switch having a number of inputs coupled to said reproducing heads and an output coupled to said receiver tube, for transforming the voltages simultaneously induced in said heads into a time sequence of current pulses applied to said receiver tube.

6. Apparatus according to claim 1 wherein said recording means include two sets of said number of recording heads, the sets being arranged, respectively, at a distance of the height of one picture, and an electronic switch for operating said two sets alternatingly.

References Cited in the file of this patent

UNITED STATES PATENTS

| | | |
|---|---|---|
| 1,771,360 | Thurm | July 22, 1930 |
| 2,109,198 | Karolus | Feb. 22, 1938 |
| 2,202,527 | Karolus | May 28, 1940 |
| 2,517,808 | Sziklai | Aug. 8, 1950 |
| 2,657,377 | Gray | Oct. 27, 1953 |
| 2,698,875 | Greenwood | Jan. 4, 1955 |